(12) United States Patent
Osterhout

(10) Patent No.: US 11,851,177 B2
(45) Date of Patent: Dec. 26, 2023

(54) UNMANNED AERIAL VEHICLE LAUNCH SYSTEM

(71) Applicant: Mentor Acquisition One, LLC, Plantation, FL (US)

(72) Inventor: Ralph F. Osterhout, San Francisco, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 1509 days.

(21) Appl. No.: 15/873,428

(22) Filed: Jan. 17, 2018

(65) Prior Publication Data

US 2018/0155025 A1    Jun. 7, 2018

Related U.S. Application Data

(63) Continuation of application No. 14/271,028, filed on May 6, 2014, now abandoned.

(51) Int. Cl.
| | |
|---|---|
| G05D 1/00 | (2006.01) |
| G05D 1/02 | (2020.01) |
| G05D 1/10 | (2006.01) |
| B64C 39/02 | (2023.01) |
| G02B 27/01 | (2006.01) |
| H04L 12/00 | (2006.01) |

(Continued)

(52) U.S. Cl.
CPC ........ B64C 39/024 (2013.01); G02B 27/0172 (2013.01); G05D 1/0016 (2013.01); G05D 1/0022 (2013.01); G05D 1/0038 (2013.01); G05D 1/0202 (2013.01); G05D 1/102 (2013.01); H04L 12/00 (2013.01); *B64U 10/13* (2023.01); *B64U 30/20* (2023.01); *B64U 80/70* (2023.01); *B64U 2201/20* (2023.01)

(58) Field of Classification Search
CPC ............ B64C 39/024; B64C 2201/027; B64C 2201/108; B64C 2201/146; B64C 2201/201; G02B 27/0172; G05D 1/0016; G05D 1/0022; G05D 1/0038; G05D 1/0202; G05D 1/102; H04L 12/00
See application file for complete search history.

(56) References Cited

U.S. PATENT DOCUMENTS

| | | |
|---|---|---|
| 1,897,833 A | 2/1933 | Benway |
| 4,852,988 A | 8/1989 | Velez |

(Continued)

FOREIGN PATENT DOCUMENTS

| | | | |
|---|---|---|---|
| CA | 2316473 A1 | 1/2001 | |
| CA | 2362895 A1 | 12/2002 | |

(Continued)

OTHER PUBLICATIONS

US 8,743,465 B2, 06/2014, Totani (withdrawn)

(Continued)

*Primary Examiner* — Anne Marie Antonucci
*Assistant Examiner* — Jingli Wang
(74) *Attorney, Agent, or Firm* — Morrison Foerster LLP

(57) ABSTRACT

Aspects of the present invention relate to unmanned aerial vehicle launch technologies and methods for receiving at a head-worn computer (HWC) a plurality of images captured by an unmanned aerial vehicle (UAV) launched from a grenade launcher, and displaying the plurality of captured images in a see-through display of the HWC.

24 Claims, 5 Drawing Sheets

(51) Int. Cl.
B64U 10/13 (2023.01)
B64U 30/20 (2023.01)
B64U 80/70 (2023.01)

(56) References Cited

U.S. PATENT DOCUMENTS

| | | | |
|---|---|---|---|
| 5,596,451 | A | 1/1997 | Handschy |
| 5,717,422 | A | 2/1998 | Fergason |
| 5,748,264 | A | 5/1998 | Hegg |
| 5,808,800 | A | 9/1998 | Handschy |
| 6,078,427 | A | 6/2000 | Fontaine |
| 6,195,136 | B1 | 2/2001 | Handschy |
| 6,347,764 | B1* | 2/2002 | Brandon ............... F42B 10/58 102/388 |
| 6,359,723 | B1 | 3/2002 | Handschy |
| 6,369,952 | B1 | 4/2002 | Rallison |
| 6,433,760 | B1 | 8/2002 | Vaissie |
| 6,456,438 | B1 | 9/2002 | Lee |
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 6,987,787 | B1 | 1/2006 | Mick |
| 7,088,234 | B2 | 8/2006 | Naito |
| 7,199,934 | B2 | 4/2007 | Yamasaki |
| 7,206,134 | B2 | 4/2007 | Weissman |
| 7,347,551 | B2 | 3/2008 | Fergason et al. |
| 7,488,294 | B2 | 2/2009 | Torch |
| 7,830,370 | B2 | 11/2010 | Yamazaki |
| 7,855,743 | B2 | 12/2010 | Sako |
| 7,928,926 | B2 | 4/2011 | Yamamoto |
| 8,004,765 | B2 | 8/2011 | Amitai |
| 8,190,147 | B2 | 5/2012 | Kauffman |
| 8,235,529 | B1 | 8/2012 | Raffle |
| 8,378,924 | B2 | 2/2013 | Jacobsen |
| 8,427,396 | B1 | 4/2013 | Kim |
| 8,494,215 | B2 | 7/2013 | Kimchi |
| 8,505,430 | B2* | 8/2013 | Miralles ............... F42B 39/14 89/1.816 |
| 8,564,883 | B2 | 10/2013 | Totani |
| 8,576,276 | B2 | 11/2013 | Bar-zeev |
| 8,576,491 | B2 | 11/2013 | Takagi |
| 8,587,869 | B2 | 11/2013 | Totani |
| 8,594,467 | B2 | 11/2013 | Lu |
| 8,611,015 | B2 | 12/2013 | Wheeler |
| 8,638,498 | B2 | 1/2014 | Bohn et al. |
| 8,662,686 | B2 | 3/2014 | Takagi |
| 8,670,183 | B2 | 3/2014 | Clavin |
| 8,696,113 | B2 | 4/2014 | Lewis |
| 8,698,157 | B2 | 4/2014 | Hanamura |
| 8,711,487 | B2 | 4/2014 | Takeda |
| 8,733,927 | B1 | 5/2014 | Lewis |
| 8,733,928 | B1 | 5/2014 | Lewis |
| 8,745,058 | B1 | 6/2014 | Garcia-barrio |
| 8,750,541 | B1 | 6/2014 | Dong |
| 8,752,963 | B2 | 6/2014 | Mcculloch |
| 8,803,867 | B2 | 8/2014 | Oikawa |
| 8,823,071 | B2 | 9/2014 | Oyamada |
| 8,837,880 | B2 | 9/2014 | Takeda |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,658,473 | B2 | 5/2017 | Lewis |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,185,147 | B2 | 1/2019 | Lewis |
| 2002/0021498 | A1 | 2/2002 | Ohtaka |
| 2003/0030597 | A1 | 2/2003 | Geist |
| 2006/0023158 | A1 | 2/2006 | Howell et al. |
| 2009/0279180 | A1 | 11/2009 | Amitai |
| 2011/0051627 | A1* | 3/2011 | El-Damhougy ...... H04W 76/19 370/255 |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0050493 | A1 | 3/2012 | Ernst |
| 2012/0062850 | A1 | 3/2012 | Travis |
| 2012/0194551 | A1* | 8/2012 | Osterhout ............... G06F 3/005 345/633 |
| 2012/0212593 | A1 | 8/2012 | Na |
| 2012/0223885 | A1 | 9/2012 | Perez |
| 2012/0250152 | A1 | 10/2012 | Larson |
| 2012/0264510 | A1 | 10/2012 | Wigdor |
| 2012/0306850 | A1 | 12/2012 | Balan |
| 2012/0327116 | A1 | 12/2012 | Liu |
| 2013/0009366 | A1 | 1/2013 | Hannegan |
| 2013/0044042 | A1 | 2/2013 | Olsson |
| 2013/0100259 | A1 | 4/2013 | Ramaswamy |
| 2013/0127980 | A1* | 5/2013 | Haddick ................. G06F 3/013 348/14.08 |
| 2013/0154913 | A1 | 6/2013 | Genc |
| 2013/0196757 | A1 | 8/2013 | Latta |
| 2013/0257622 | A1 | 10/2013 | Davalos |
| 2014/0028704 | A1 | 1/2014 | Wu |
| 2014/0043682 | A1 | 2/2014 | Hussey |
| 2014/0062854 | A1 | 3/2014 | Cho |
| 2014/0129328 | A1 | 5/2014 | Mathew |
| 2014/0146394 | A1 | 5/2014 | Tout |
| 2014/0147829 | A1 | 5/2014 | Jerauld |
| 2014/0152530 | A1 | 6/2014 | Venkatesha |
| 2014/0152558 | A1 | 6/2014 | Salter |
| 2014/0152676 | A1 | 6/2014 | Rohn |
| 2014/0159995 | A1 | 6/2014 | Adams |
| 2014/0160055 | A1 | 6/2014 | Margolis |
| 2014/0160157 | A1 | 6/2014 | Poulos |
| 2014/0160170 | A1 | 6/2014 | Lyons |
| 2014/0168735 | A1 | 6/2014 | Yuan |
| 2014/0176603 | A1 | 6/2014 | Kumar |
| 2014/0177023 | A1 | 6/2014 | Gao |
| 2014/0195918 | A1 | 7/2014 | Friedlander |
| 2015/0142211 | A1 | 5/2015 | Shehata |
| 2015/0168731 | A1 | 6/2015 | Robbins |
| 2016/0293015 | A1* | 10/2016 | Bragin ................. B64C 39/024 |

FOREIGN PATENT DOCUMENTS

| | | | |
|---|---|---|---|
| CA | 2388766 | A1 | 12/2003 |
| EP | 368898 | A1 | 5/1990 |
| EP | 777867 | A1 | 6/1997 |
| EP | 2486450 | A1 | 8/2012 |
| EP | 2502410 | A1 | 9/2012 |
| WO | WO2011143655 | A1 | 11/2011 |
| WO | WO2012058175 | A1 | 5/2012 |
| WO | WO2013050650 | A1 | 4/2013 |
| WO | WO2013103825 | A1 | 7/2013 |
| WO | WO2013110846 | A1 | 8/2013 |
| WO | WO2013170073 | A1 | 11/2013 |

OTHER PUBLICATIONS

US 8,792,178 B2, 07/2014, Totani (withdrawn)

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Final Office Action dated Jan. 27, 2017, for U.S. Appl. No. 14/271,028, filed May 6, 2014, eleven pages.

Non-Final Office Action dated Apr. 18, 2016, for U.S. Appl. No. 14/271,028, filed May 6, 2014, eight pages.

(56) References Cited

OTHER PUBLICATIONS

Schedwill, "Bidirectional OLEO Microdisplay", Fraunhofer Research Institution for Organics, Materials and Electronic Device Comedd, Apr. 11, 2014, 2 pages.
Vogel, et al., "Data glasses controlled by eye movements", Information and communication, Fraunhofer-Gesellschaft, Sep. 22, 2013, 2 pages.
Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf , retrieved on Oct. 26, 2020.
Bimber, Oliver et al. (2005). "Spatial Augmented Reality: Merging Real and Virtual Worlds," A. K. Peters, Ltd., Wellesley, MA.

* cited by examiner

UNMANNED AERIAL VEHICLE LAUNCH SYSTEM

CLAIM TO PRIORITY

This application is a continuation of the following U.S. patent application, which is incorporated by reference in its entirety: U.S. Ser. No. 14/271,028, filed May 6, 2014.

BACKGROUND

Field of the Invention

This invention relates unmanned aerial vehicle (UAV) systems. More particularly, this invention relates to UAV launch technologies.

Description of Related Art

Unmanned aerial vehicles (UAVs) are used in connection with many different operations. UAVs come in many shapes and sizes. A need exists to improve UAVs and to improve UAV launch systems to make UAVs more useful and deployable.

SUMMARY

Aspects of the present invention relate to UAV launch technologies.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures.

While the invention has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present invention relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
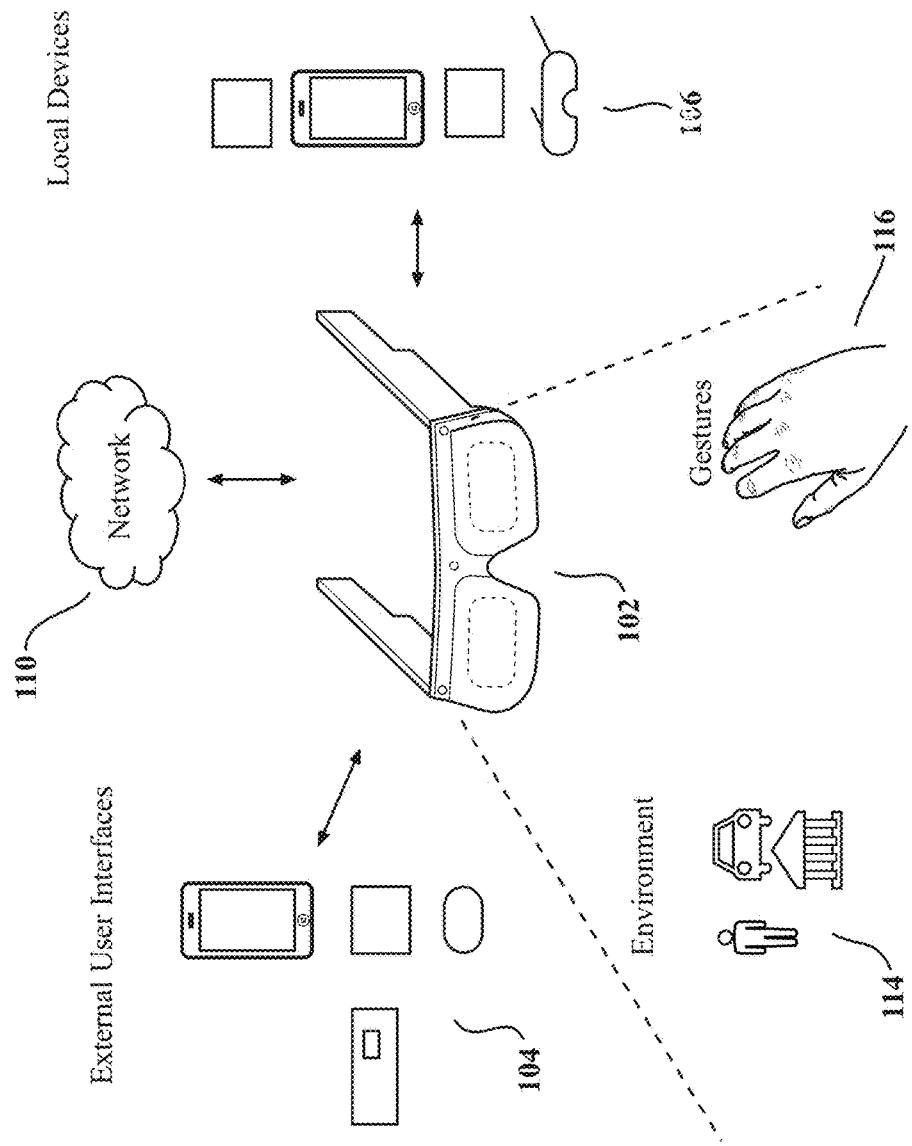
FIG. 1 illustrates a head worn computing system in accordance with the principles of the present invention.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g. captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
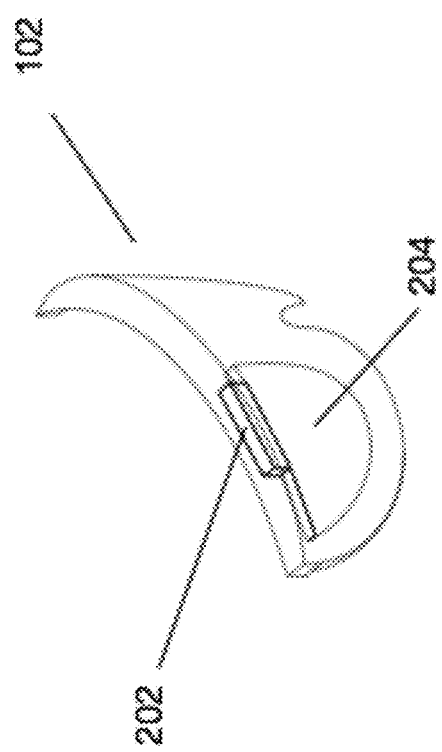
FIG. 2 illustrates a head worn computing system with optical system in accordance with the principles of the present invention.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present invention includes other physical configurations, such as that when the two modules are combined into a single module or where the elements making up the two modules are configured into more than two modules. In embodiments, the upper module 202 includes a computer controlled display (e.g. LCoS, DLP, OLED, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present invention that embodiments will contain two image light delivery systems, one for each eye. It should also be noted that while many embodiments refer to the optical modules as "upper" and "lower" it should be understood that this convention is being used to make it easier for the reader and that the modules are not necessarily located in an upper-lower relationship. For example, the image generation module may be located above the eye delivery optics, below the eye delivery optics, on a side of the eye delivery optics, or otherwise positioned to satisfy the needs of the situation and/or the HWC 102 mechanical and optical requirements.

An aspect of the present invention relates to launch technologies related to unmanned aerial vehicles (UAVs). In embodiments, the launch system is adapted to use a grenade launcher (e.g. 40 mm grenade launcher) for ease of field integration. In embodiments, the launch system is adapted to be relatively quiet to allow for covert operations. When a grenade launcher is normally used in the field, quietness is not a significant requirement because the grenade being launched is going to land at a relatively short distance from the launcher and there is going to be a rather large noise made by the exploding grenade. The inventors of the present invention have realized that the use of a grenade launcher can provide ease for field integration and the launch should be relatively quiet to allow for those instances where one wants to launch the UAV and remain unnoticed. The inventors have also discovered that the use of an explosive charge to send the UAV to its usable or near usable height can significantly save on UAV battery life and hence increase the fly time of the UAV.

Figure 3:
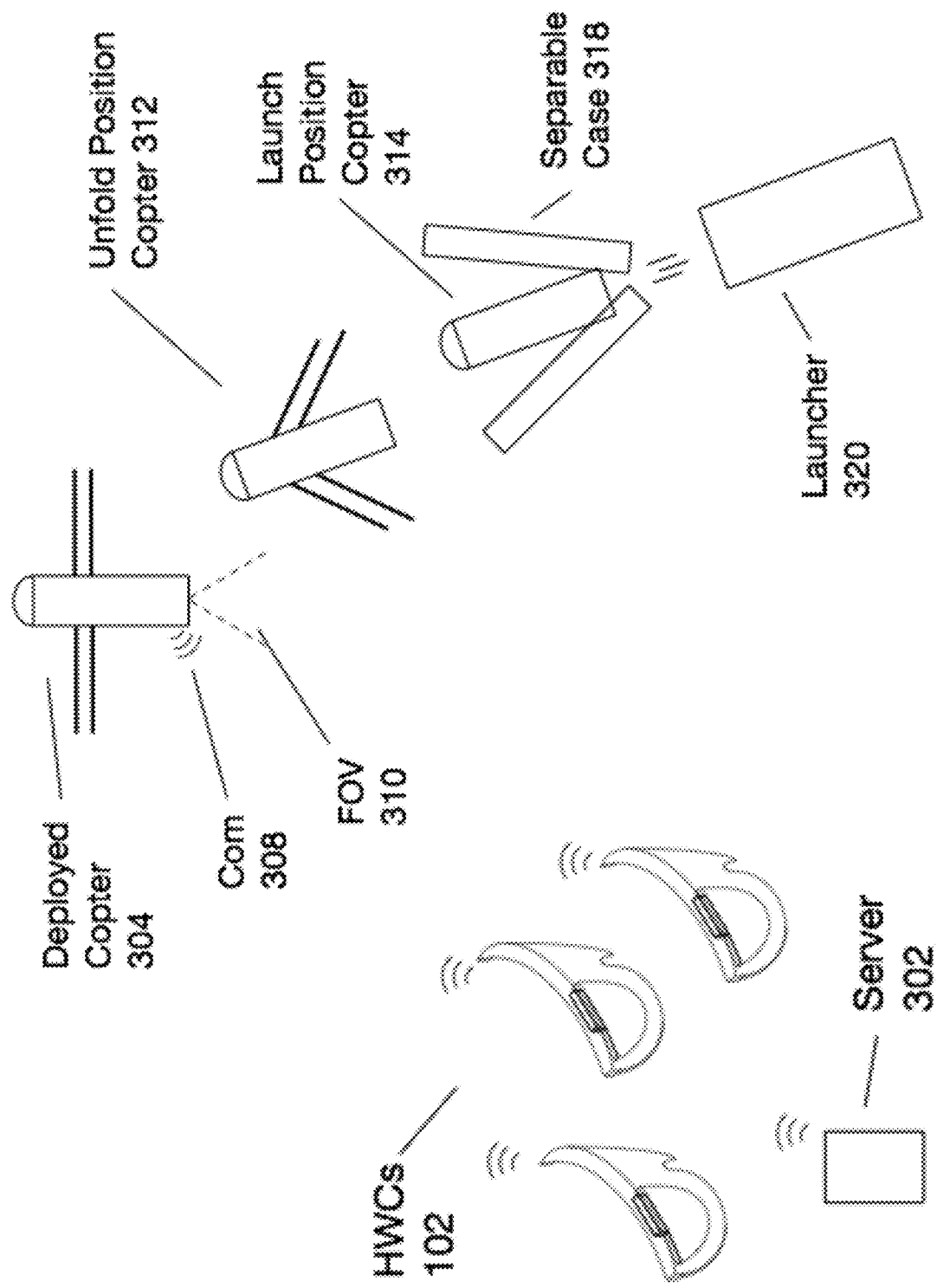
FIG. 3 illustrates a UAV launch and communication system in accordance with the principles of the present invention.

FIG. 3 illustrates a UAV launch system according to the principles of the present invention. In this embodiment, the launcher 320 may be a grenade launcher, such as a stand-alone grenade launcher, grenade launcher rifle combination, etc. An explosive charge may then be used to launch the UAV 314 from the grenade launcher 320. In embodiments, the UAV 314 is held in a launch position inside of a separable case 318. The separable case 318 may be designed to encase the UAV 314 in a launch position and the separable case 318, with the UAV inside, can be fired out of the launcher 320. The separable case 318 may then separate from the UAV in mid-flight. Once released from the separable case 318, the UAV may deploy flight sustaining elements, such as counter rotating blades that can keep the UAV in-flight in a controlled system, as indicating as unfold UAV position 312. Once the UAV achieves its fully deployed position 304 it may fly autonomously or through the control of a remote operator. The fully deployed UAV 304 may take the form of a dual counter rotating blade helicopter and it may operate a self contained camera with a field of view 310 to image the surroundings, sensors to sense environmental conditions of the surroundings, etc. The output from the camera and other sensors may be communicated to other systems through communication channel(s) 308. The UAV 304 may be controlled by a person on the ground in near proximity to the UAV. For example, a person wearing a HWC 102 may control the UAV as an externally controlled device 108 through the use of gestures 116, external control devices 104, etc. (as described herein elsewhere) with the HWC 102 communicating with the UAV either directly or indirectly.

As indicated in FIG. 3, the UAV may communicate with devices on the ground, such as HWC(s) 102, server(s), etc. to get files, streams, etc. from the UAV's camera and other sensor systems to persons in need of such information. The ground devices may further be used to control the flight and sensor systems of the UAV. For example, a person on the ground wearing a HWC 102 may receive files and streams of information from the UAV 304 and the person may also control the functions of the UAV by using control technologies described herein elsewhere.

Figure 4:
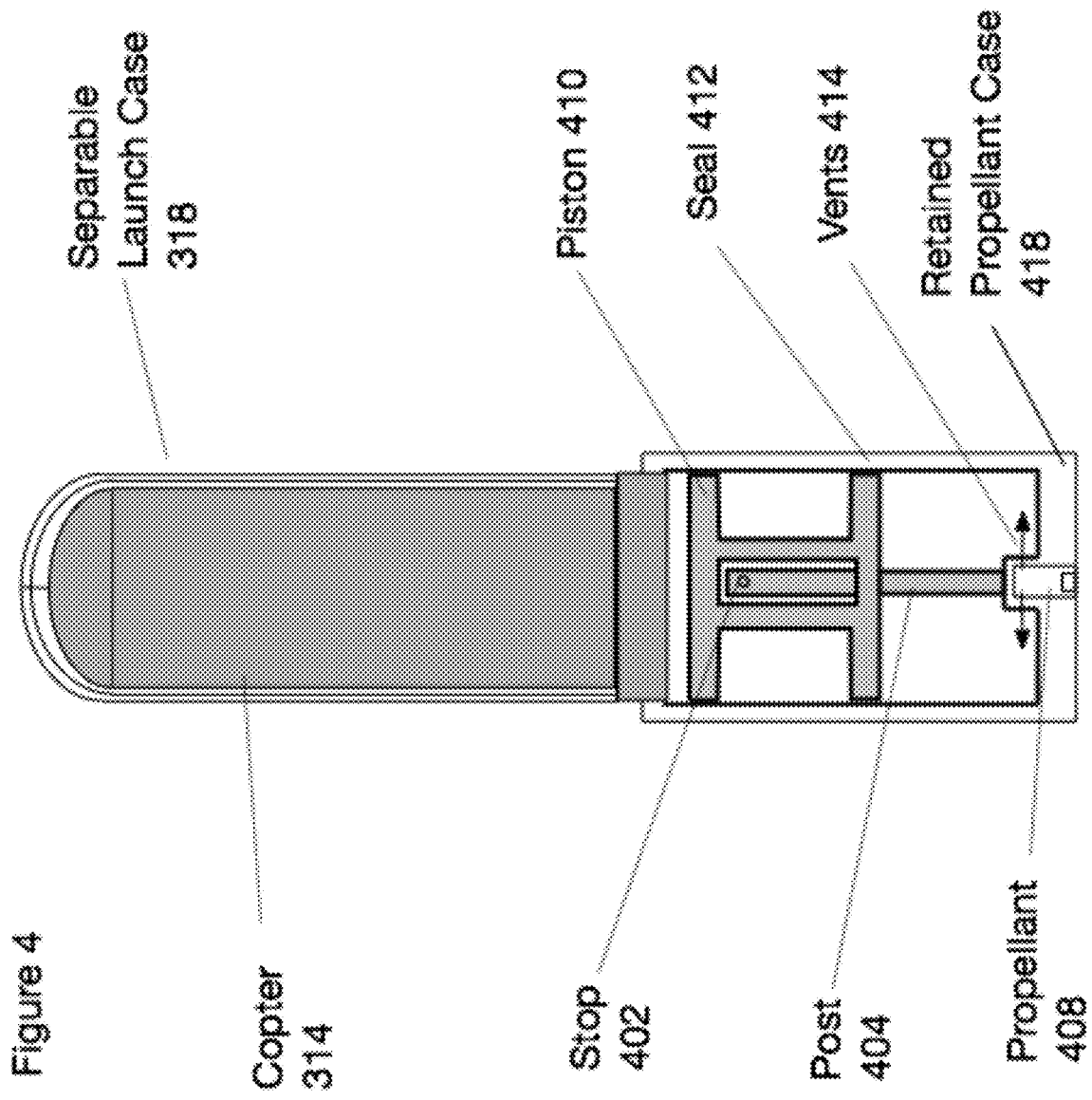
FIG. 4 illustrates a launch system in accordance with the principles of the present invention.

FIG. 4 illustrates a UAV launch system adapted to be loaded and fired from a grenade launcher (not shown). The UAV launch system illustrated in this embodiment includes a separable launch case 318, which houses the UAV copter 314 in a launch configuration. The separable launch case 318 is secured to a retained propellant case 418. Both the separable launch case 318 and the retained propellant case are configured to be loaded into a grenade launcher for launching. The retained propellant case 418 houses a piston 410 that travels on a post 404. The piston 410 is illustrated in the pre-launch or down position. The retained propellant case 418 also includes a propellant container that contains a propellant 408. The grenade launcher (not shown) will trigger the propellant 408 to initiate the UAV launch. The propellant container has vents that allow the propellant to expand rapidly into the nearby container once triggered. The expanding gas pushes the piston 410 towards the UAV 314 and the separable launch case 318. The piston travels along the post 404 and the piston is stopped by the stop 402 towards the top of the post 404. The piston 410 has a seal 412 that seals, at least temporarily, the vessel below the piston 410 to contain a substantial amount of the gas that expands into the vessel from the triggered propellant. The upper portion of the piston 410 may also be sealed to help prevent the expanding gas from escaping into the surrounding environment. The seal 412 contains the expanding gas and resulting pressure and also prevents a loud noise from being generated by containing the gas. If the gas were allowed to escape to the surrounding environment quickly a loud noise would occur and the launch event would be marked by a loud audio signature. The seal(s) 412, or others, causing the expanding gas to be contained may permit the gas to slowly escape following the launch; so long as the leak is slow it will not cause a loud noise. The purpose of the seals is to contain the gas pressure to prevent a loud launch noise, so a substantial portion of the gas needs to be contained for at least a short period of time and then the gas can slowly escape around the seals.

Figure 5:
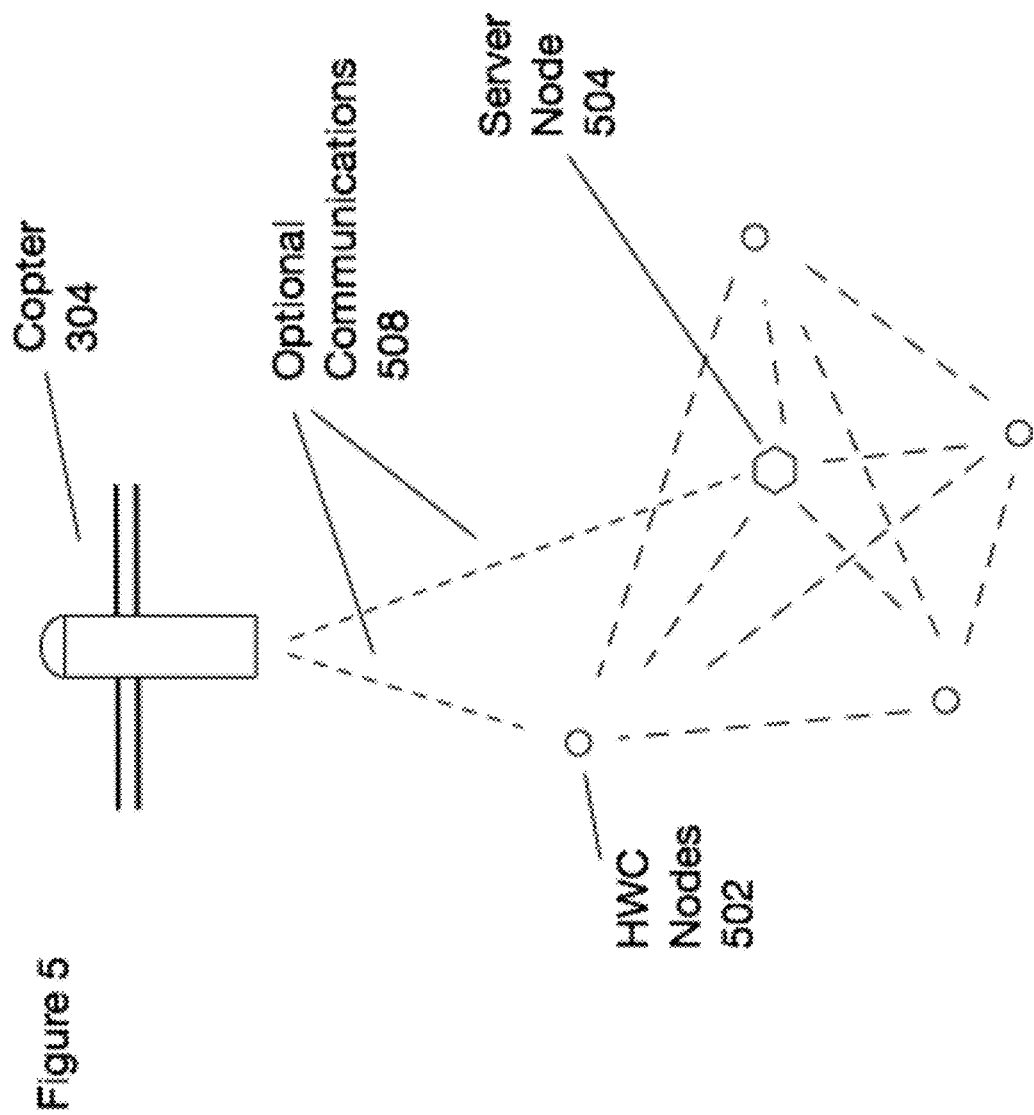
FIG. 5 illustrates a communication system in accordance with the principles of the present invention.

FIG. 5 illustrates a UAV communication network in accordance with the principles of the present invention. Once deployed, the UAV 304 may communicate with ground personnel via optional communications links 508. For example, the optional communications links 508 may include a communication protocol that involves the UAV 304 communicating to a server node 504 on the ground and then the server node may communicate the information with the HWC 102 nodes 502. In other embodiments, the UAV 304 may communicate with an HWC 102 node 502 directly. The HWC 502 nodes and the server node may be arranged in an ad-hoc self-healing network arrangement. In other embodiments, the network topology and protocols may be otherwise arranged (e.g. spoke and hub, IP, etc.).

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC.

All documents referenced herein are hereby incorporated by reference.

I claim:

1. A method, comprising:
receiving, at a first time, at a head-worn computer (HWC), a first video captured by a sensor of an unmanned aerial vehicle (UAV) launched via a launch system;
receiving input at the HWC from a user of the HWC;
communicating the input via the HWC to a flight system of the UAV;
receiving, at a second time later than the first time, a second video captured by the sensor of the UAV; and
displaying the first video and the second video to the user via a see-through display of the HWC,
wherein:
the communicating the input to the flight system causes the UAV to, in accordance with a determination by the HWC that the UAV is deployed from the launch system, move from a first position at the first time to a second position at the second time, and
the flight system is configured to, in accordance with a determination by the HWC that the UAV is not deployed from the launch system, forgo causing the UAV to move from the first position to the second position.

2. The method of claim 1, wherein the UAV comprises counter rotating blades and the input comprises control input for the counter rotating blades.

3. The method of claim 1, wherein receiving the first video at the HWC comprises receiving the first video at the HWC from the UAV via a server node on the ground.

4. The method of claim 3, wherein receiving the first video at the HWC from the UAV via the server node comprises receiving the first video at the HWC via an ad-hoc network.

5. The method of claim 4, wherein the ad-hoc network comprises a plurality of HWCs.

6. The method of claim 3, wherein receiving the first video at the HWC from the UAV via the server node comprises receiving the first video at the HWC via a spoke and hub network comprising the server node and a plurality of HWCs.

7. The method of claim 1, wherein the input comprises control input for the sensor.

8. The method of claim 1, wherein the first video comprises streaming video.

9. The method of claim 1, wherein receiving the input at the HWC comprises receiving the input via a mobile phone.

10. The method of claim 1, wherein receiving the input at the HWC comprises receiving the input via a wearable device that does not include the HWC.

11. The method of claim 1, wherein the input comprises gesture input.

12. The method of claim 1, wherein receiving the input at the HWC comprises:
identifying a device in communication with the HWC;
presenting a customized GUI on the HWC based on the identified device; and
receiving the input via the device.

13. A system comprising:
a head-worn computer (HWC) comprising a see-through display; and
one or more processors configured to perform a method comprising:
receiving, at a first time, at the HWC, a first video captured by a sensor of an unmanned aerial vehicle (UAV) launched via a launch system;
receiving input at the HWC from a user of the HWC;
communicating the input via the HWC to a flight system of the UAV;
receiving, at a second time later than the first time, a second video captured by the sensor of the UAV; and
displaying the first video and the second video to the user via the see-through display, wherein:
the communicating the input to the flight system causes the UAV to, in accordance with a determination by the HWC that the UAV is deployed from the launch system, move from a first position at the first time to a second position at the second time, and
the flight system is configured to, in accordance with a determination by the HWC that the UAV is not deployed from the launch system, forgo causing the UAV to move from the first position to the second position.

14. The system of claim 13, wherein the UAV comprises counter rotating blades and the input comprises control input for the counter rotating blades.

15. The system of claim 13, wherein receiving the first video at the HWC comprises receiving the first video at the HWC from the UAV via a server node on the ground.

16. The system of claim 15, wherein receiving the first video at the HWC from the UAV via the server node comprises receiving the first video at the HWC via an ad-hoc network.

17. The system of claim 16, wherein the ad-hoc network comprises a plurality of HWCs.

18. The system of claim 15, wherein receiving the first video at the HWC from the UAV via the server node comprises receiving the first video at the HWC via a spoke and hub network comprising the server node and a plurality of HWCs.

19. The system of claim 13, wherein the input comprises control input for the sensor.

20. The system of claim 13, wherein the first video comprises streaming video.

21. The system of claim 13, wherein receiving the input at the HWC comprises receiving the input via a mobile phone.

22. The system of claim 13, wherein receiving the input at the HWC comprises receiving the input via a wearable device that does not include the HWC.

23. The system of claim 13, wherein the input comprises gesture input.

24. The system of claim 13, wherein receiving the input at the HWC comprises:
identifying a device in communication with the HWC;
presenting a customized GUI on the HWC based on the identified device; and
receiving the input via the device.

* * * * *